H. H. BENN.
FRICTION CLUTCH.
APPLICATION FILED MAR. 28, 1910.

966,299.

Patented Aug. 2, 1910.
2 SHEETS—SHEET 1.

Witnesses
Geo. L. Byrne.
B. B. Collings.

Inventor
Hans H. Benn
By Wilkinson, Fisher & Witherspoon
Attorneys

H. H. BENN.
FRICTION CLUTCH.
APPLICATION FILED MAR. 28, 1910.

966,299.

Patented Aug. 2, 1910.
2 SHEETS—SHEET 2.

Witnesses
B. B. Collings.
Geo. A. Bynoe.

Inventor
Hans H. Benn
By Wilkinson, Fisher & Witherspoon
Attorneys

UNITED STATES PATENT OFFICE.

HANS H. BENN, OF DAVOS PLATZ, SWITZERLAND.

FRICTION-CLUTCH.

966,299.  Specification of Letters Patent.  Patented Aug. 2, 1910.

Application filed March 28, 1910.  Serial No. 552,007.

*To all whom it may concern:*

Be it known that I, HANS H. BENN, a subject of the King of Great Britain and Ireland, residing at Davos Platz, Switzerland, have invented certain new and useful Improvements in Friction-Clutches; and I do hereby declare the following to be a full, clear, and exact description of the invention, such as will enable others skilled in the art to which it appertains to make and use the same.

My invention relates to improvements in friction clutches of the type in which friction rings are moved into and out of their service position by means of toggle levers acted upon by a spring or springs, the latter serving to maintain and hold the friction plates in their service position when the clutch is in operation. With this type of clutch, difficulty has been experienced in the provision of simple and effective means which while driving and guiding the friction rings in a satisfactory manner, also allow for the ready removal of said rings and their connected parts from the hollow drum, for the purpose of inspection and renewal.

The objects of the present invention are to overcome this difficulty and certain disadvantages hereinafter referred to, incident to the present form of clutch of the type referred to.

Figure 1:
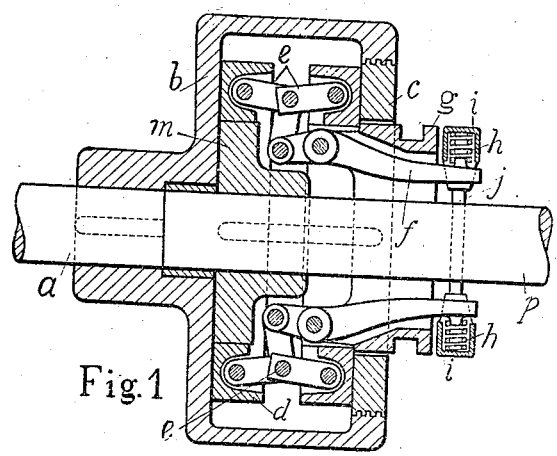
Figure 2:
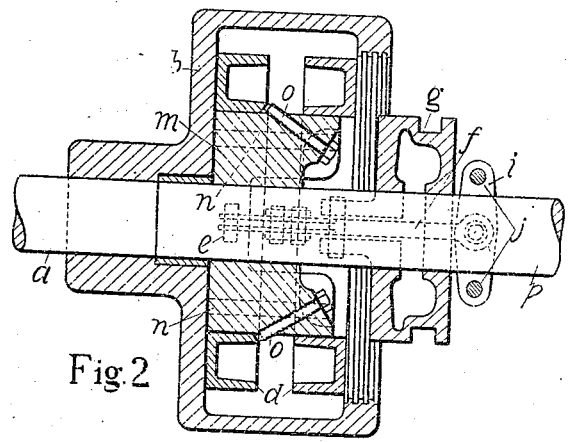
Figure 3:
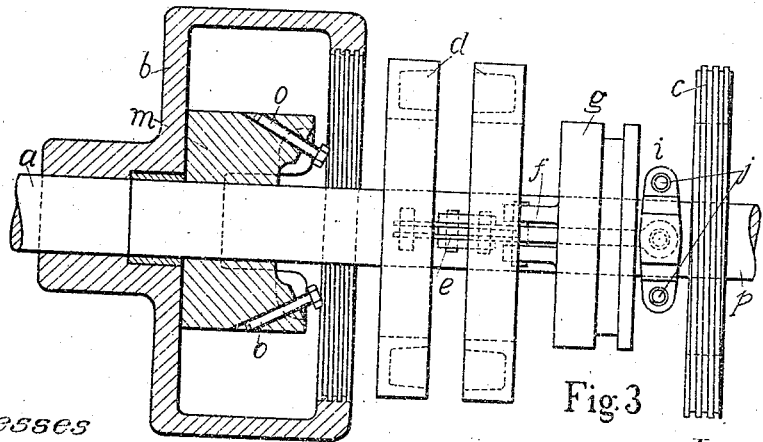
Figure 4:
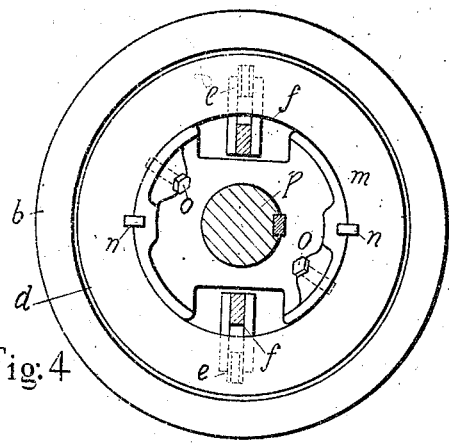
Figure 5:
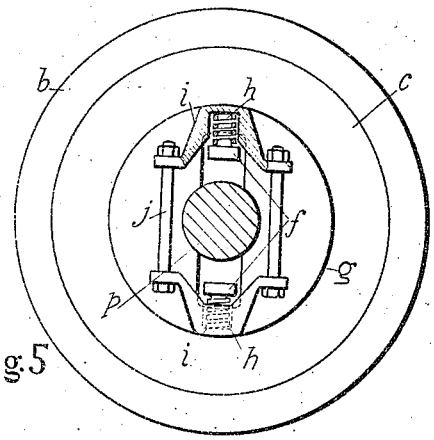
Figures 6, 7:
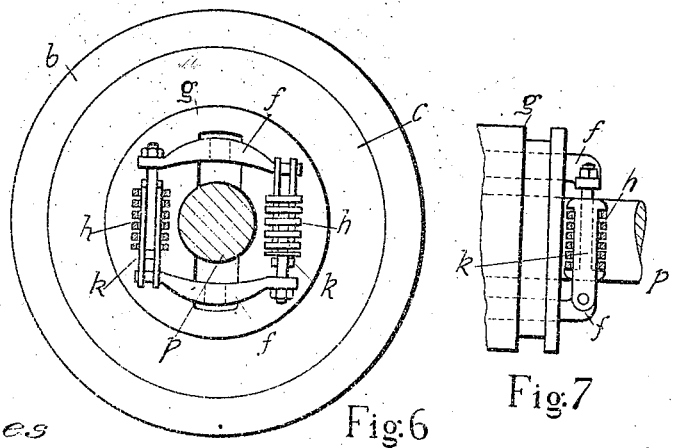

In the accompanying drawings—Figure 1 is a longitudinal section of my improved clutch. Fig. 2 is a longitudinal section taken in a different plane and with the cover removed. Fig. 3 is a side view, partly in section, illustrating the parts as removed from the hollow drum for the purpose of inspection or repair. Figs. 4 and 5 are horizontal cross sections with the end cover removed and in position, respectively. Figs. 6 and 7 are cross sections and a partial end view, showing a modification.

$a$ and $p$ represent the shafts, either of which may be the driving shaft. The shaft $a$ has keyed thereon a hollow drum $b$ internally screw-threaded on one end to receive an annular cover $c$. Means such as a bolt passing through the drum $b$ and entering a slot in the cover $c$, may be employed to prevent the rotation of said cover. This cover is provided with holes or lugs (not shown) by means of which it may be removed from or inserted into the drum $b$. On the shaft $p$ is keyed a driving drum $m$, and on this drum $m$ are mounted two friction rings $d$, being keyed to said drum in the usual manner by keys $n$, passing into keyways in the rings $d$, but adapted to be slid off of said drum, as shown in Fig. 3. The friction rings $d$ are arranged to bear against the inner faces of the drum $b$ and the cover $c$ by means of toggle levers $e$, operated by links connected to the levers $f$, said levers being mounted on pins in a sleeve $g$, which is slidably mounted on the shaft $p$ and arranged to fit within the cover $c$, as shown in Fig. 1. In ordinary service conditions, these levers $f$, by means of the connections already described, press the friction rings $d$ against the interior of the drum.

$h$ represents springs, bearing on the levers $f$, which ordinarily tend to press said levers so that they extend the toggles $e$ and therefore hold the friction rings $d$ in contact with the drum $b$ and its cover. These springs are of the compression instead of the extension type, as have hitherto been employed. The objection to the extension type is that they are very easily overstrained, after which they give reduced power, even though there may be no outward visible sign of their having been overstrained. The position in which they work does not lend itself to the introduction of safety stops to prevent overstraining. With compression springs this difficulty obviously does not occur. In the form shown in Fig. 5, the springs $h$, which bear upon the levers $f$, are held by yokes $i$, connected together by bolts $j$ and the tension of the springs may be adjusted by screwing or unscrewing the nuts on said bolts $j$.

In the modification shown in Figs. 6 and 7, the levers $f$ have extended ends, and the springs $h$ are carried on stirrups $k$ in the usual manner. These stirrups are composed of two parts, one sliding within the other and one terminating in a head, and the tension of the springs may be adjusted by the bolts on one of the parts of the stirrups.

The sleeve $g$ is slidably mounted on the shaft $p$ and to retain the rings $d$ in their proper position on the drum $m$, when the clutch is disengaged I provide inclined bolts $o$, which serve as stops. When these bolts are screwed home, as shown in Fig. 2, they, when the clutch is being disengaged, limit the withdrawal motion of the back friction ring which contacts with their projecting ends and insures the positive disengagement of both friction rings of the clutch. If no such stops were employed, the motion of the sliding sleeve $g$ would be entirely communicated to the inner friction ring, and there would be no positive release of the outer friction ring. When, however, it is desired to remove the interior parts for inspection or repair, the cover $c$ is first removed, as shown in Fig. 2, then the bolts $o$ are unscrewed until their outer ends become flush with the surface of the drum $m$, as shown in Fig. 3, whereupon all the interior parts can be removed, as indicated in Fig. 3. To reassemble the drum, the parts are pushed in from the position shown in Fig. 3 until one of the friction rings $d$ contacts with the surface of the drum $b$, and the bolts $o$ are then screwed into the position shown in Fig. 2. The cover $c$ is then screwed in and the clutch is fully assembled as shown in Fig. 1.

In operation, the disks $d$ are held firmly against the drum $b$ and cover $c$ by means of the springs $h$, acting through the connections already described.

While I have shown and described my invention as applicable to a shaft clutch, it will of course be understood that it can also be applied to pulley couplings and similar constructions.

I claim:—

1. In a friction clutch, the combination of a shaft having a drum keyed thereto, another shaft having a smaller drum keyed thereto, friction disks carried on said second named drum, means for pressing said friction disks away from each other, against the interior of the first named drum, and stops carried by said second named drum for normally holding one of said friction rings in position when the clutch is disengaged, substantially as described.

2. In a friction clutch, the combination of a shaft having a hollow drum keyed thereto, an annular cover adapted to be screwed into one end of said drum, a second shaft in line with said first named shaft, a smaller drum keyed to said second named shaft, a plurality of friction rings keyed to and sliding on said second named drum, a sleeve surrounding said second named shaft, means for pressing said friction rings against said first named drum and its cover, including springs, levers, links, and toggle joints, said sleeve, friction rings, and connections being adapted to be slid freely along said second named shaft, and adjustable stops carried by said second drum to provide for the positive disengagement of the clutch by the movement of said sleeve, substantially as described.

3. In a friction clutch, the combination of a shaft, a hollow drum keyed thereon, an annular cover adapted to be screwed into one end of said drum, a second shaft in line with said first named shaft, a smaller drum keyed to said second named shaft, a plurality of friction rings mounted on said second named drum and keyed thereto, but adapted to slide thereon, a sleeve adapted to slide freely on said second named shaft, levers mounted in said sleeve, links carried by the interior ends of said levers, toggle levers connected to said links and to said friction rings, respectively, and compression springs normally tending to extend said toggles and cause engagement of said friction rings with said drum, substantially as described.

4. In a friction clutch, the combination of a shaft, a hollow drum keyed thereon, an annular cover adapted to be screwed into one end of said drum, a second shaft in line with said first named shaft, a smaller drum located within said first named drum and keyed to said second named shaft, a plurality of friction rings mounted on said second named drum and keyed thereto, but adapted to slide thereon and to engage with the inner faces of said first named drum and cover, stops adjustably secured in said second named drum for engaging one of said friction rings, a sleeve adapted to slide freely on said second named shaft and entering said cover, levers mounted in said sleeve, links carried by the interior ends of said lever, toggle levers connected to said links and to said friction rings, respectively, and compression springs, the force of which can be adjusted, normally tending to extend said toggles and cause said friction rings to engage with said drum and cover, substantially as described.

In testimony whereof, I affix my signature, in presence of two witnesses.

HANS H. BENN.

Witnesses:
 ERNST TONZAL,
 M. SCHUDAK.